(12) United States Patent
Dedrick et al.

(10) Patent No.: US 7,363,245 B1
(45) Date of Patent: Apr. 22, 2008

(54) ELECTRONIC PRODUCT PACKAGING AND DISTRIBUTION FOR E-COMMERCE

(75) Inventors: Rick Dedrick, Hillsboro, OR (US);
Laura Shine, Hillsboro, OR (US);
Jeanne M. Koski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 09/540,239

(22) Filed: Mar. 31, 2000

(51) Int. Cl.
*G06Q 30/00* (2006.01)

(52) U.S. Cl. ......................................... 705/26; 709/225

(58) Field of Classification Search ................... 705/26; 709/225
See application file for complete search history.

(56) References Cited

U.S. PATENT DOCUMENTS

| | | | |
|---|---|---|---|
| 5,991,807 A * | 11/1999 | Schmidt et al. | 709/225 |
| 6,167,383 A * | 12/2000 | Henson | 705/26 |
| 6,182,142 B1 * | 1/2001 | Win et al. | 709/229 |
| 6,189,146 B1 * | 2/2001 | Misra et al. | 717/11 |
| 6,446,117 B1 * | 9/2002 | Gebauer | 709/217 |

FOREIGN PATENT DOCUMENTS

WO 98/37480 * 8/1998

OTHER PUBLICATIONS

"Norton, distributors partner to sell abrasives online", "Business & Industry", v 128, n4, p. 98, Mar. 23, 2000.*

* cited by examiner

*Primary Examiner*—Michael Cuff
(74) *Attorney, Agent, or Firm*—Schwabe, Williamson & Wyatt, P.C.

(57) ABSTRACT

The invention generally relates to packaging and distribution of goods for e-Commerce transactions, and more particularly to extending electronic shopping carts to include rules controlling access and distribution to a cart's goods. One embodiment includes a distribution method, in which an online distribution server, configured to receive incoming connections from a client, is connected to. A list of goods available for electronic and physical distribution to the client is received, and goods from the list are selected. Selected goods are added to an electronic shopping cart, and creation of a distribution package according to contents of electronic shopping cart is requested. Access restrictions for the distribution package are then assigned. Thus, access to the package created from the shopping cart can be restricted to only authorized clients.

29 Claims, 4 Drawing Sheets

ELECTRONIC PRODUCT PACKAGING AND DISTRIBUTION FOR E-COMMERCE

FIELD OF THE INVENTION

The invention generally relates to packaging and distribution of goods for e-Commerce transactions, and more particularly to extending electronic shopping carts to include rules controlling access and distribution to a cart's goods.

BACKGROUND

Recently, traditional sales environments have made way for a new World Wide Web (web) approach to sales. The web is one facet of a global computer network commonly referred to as the Internet. Once, access to the Internet was essentially limited to corporations, universities, and government agencies. In recent years, however, consumer network connections have become commonplace, with connections being provided via dial-up modem connections to an Internet Service Provider (ISP), through cable modems (using the coaxial cables delivering cable-TV service), digital subscriber lines (DSL) (carried over common twisted pair telephone wiring), wireless services, and other mediums.

The Internet allows computer systems and networks, by way of protocols and bridging/routing hardware, to interconnect via the Internet to form networks similar to local area networks (LANs or "intranets"). Through the internet, consumers are able to direct Internet browsers (e.g., Netscape Navigator and Internet Explorer) to virtual storefronts encoded as Hypertext Markup Language (HTML) or equivalent "web pages", as well as access other Internet "content" such as electronic mail (e-mail), news services, stock reports, travel services, and the like.

However, unlike in traditional retail contexts, there is no restriction on online stores regarding the location of goods offered by a store, nor the contents of the store. That is, a "virtual store" can present as in-stock goods that will actually be provided by multiple different vendors in communication with the virtual store. When a purchase is made, the virtual store can contact different vendors to effect delivery of purchased goods. With the advent of easy internetworking, and the global scope of the Internet, merchants and consumers are provided with heretofore unknown ability to reach a very large audience of other merchants and consumers.

To facilitate a consumer's spending quite a while browsing through a virtual store, such stores provide a virtual "shopping cart" to track intended purchases. As a consumer selects items for sale, these items are placed in the virtual shopping cart for later checkout. When the consumer ultimately seeks to leave the store, the consumer is directed to a virtual register to complete a point of sale transaction for goods accumulated within the shopping cart.

Although virtual storefronts greatly facilitate transactions by allowing arbitrarily complex (or simple) virtual storefronts, these virtual stores lack an ability to impose structure and coordinate the sales process. That is, frequently businesses want certain classes of employees to purchase particular collections of products (packages), or purchase from only certain types of products. For example, technical support personnel may be required to obtain certain high-end software and hardware, while recently hired employees may be restricted in their purchase ability. Also, employers may desire to control the registration and installation of purchased goods.

Unfortunately, imposing such structure on the sales process is not yet provided by virtual storefronts. In addition, virtual storefronts presently lack ability to seek alternate sales and installation avenues when a customer appears to lack authorization to make a purchase. Thus, in order to impose sales requirements, track licenses, etc., an inefficient approach is generally employed, where an employee is designated as responsible for performing purchases for other employees and monitoring installations of these other employees.

SUMMARY

A distribution method, in which an online distribution server, configured to receive incoming connections from a client, is connected to. A list of goods available for electronic and physical distribution to the client is received, and goods from the list are selected. Selected goods are added to an electronic shopping cart, and creation of a distribution package according to contents of electronic shopping cart is requested. Access restrictions for the distribution package are then assigned.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

Figure 1:
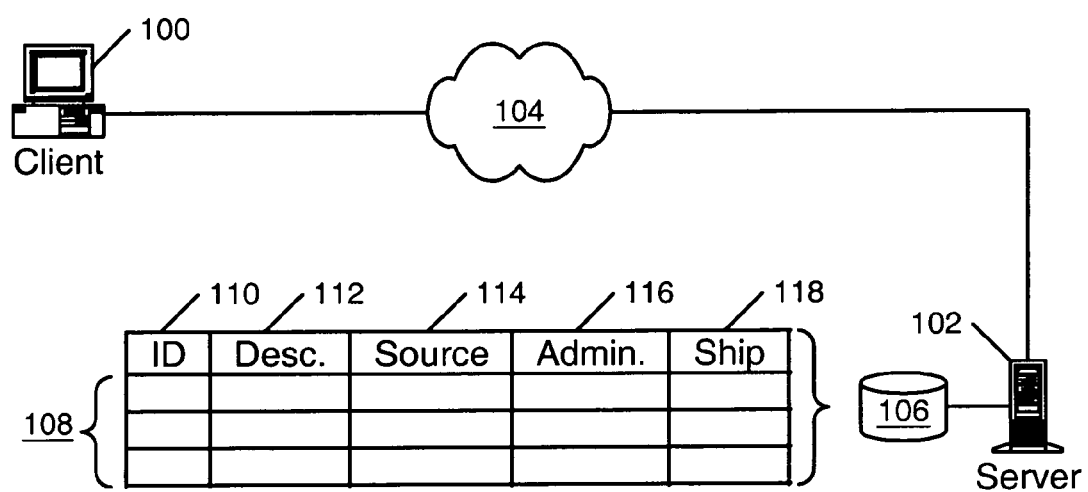
FIG. 1 illustrates a client (consumer) in communication with a distribution server (virtual storefront) over a network.

FIG. 1 illustrates a client 100 (consumer) in communication with a distribution server 102 (hosting the virtual storefront) over a network 104 (e.g., the Internet or other network).

It is assumed that the network connection is secured as necessary, such as through use of Internet Protocol (IP) encryption, Secured Socket Layers (SSL), or other encryption technology. In contrast with traditional sales environments, provided is a sales environment in which purchase conditions can be required and enforced. As used herein, the terms "server" and "distribution server" are intended to be synonymous. In addition, note that although the client 100 is usually a consumer/purchaser, as will be discussed more fully below, client's can also be managers or other entities that contact the server 102 to define packages or modify the server's operation.

In one embodiment, the client 100 contacts the server 102, and is automatically presented with an interface indicating that certain packages (collections of goods to be obtained) can or should be purchased by the client. For simplicity, it is assumed a client 100 is interacting with a single virtual storefront, however it will be appreciated that the invention is applicable to multiple storefronts, such that the consumer can browse different storefronts to determine who is offering a particular package at a least-expensive price.

In one embodiment, clients 100 uses a network web browser such as Netscape Navigator or Microsoft Internet Explorer to contact a web-based application, such as one implemented in Allaire Corporation's ColdFusion, HTML, Java, JavaScript, Common Gateway Interface (CGI) application programs, etc. A connecting client 100 may purchase goods such as hardware, software, books, music CDs, etc., and then install or upgrade the goods (if applicable) over the network 104 connection.

Available goods are stored in a database 106 in communication with the server 102, where database records 108 (entries) correspond to goods for sale. Records may be compound in that one record can correspond to a "package" corresponding to multiple goods that have been grouped for sale. In the illustrated embodiment, each record includes a unique ID 110 for each good for sale, a description 112, a source 114 for a good (e.g., an identifier of an external source for the good), and administrative data 116 corresponding to an entity or entities responsible for creating, maintaining, and handling issues related to sale of the good. It will be appreciated that a variety of formats may be used to track and cross-reference goods for sale.

In one embodiment, Microsoft Open DataBase Connectivity (ODBC) is used to access the database 106. ODBC allows application programs to interact with any ODBC compliant database management systems (DBMS) handling data. Generally, ODBC operates by providing "a middle layer" database driver between an application and a particular DBMS. This layer translates the application's data ODBC queries into native commands for the DBMS. An example of an ODBC application program is ColdFusion, a product allowing web pages written in Cold Fusion Markup Language (CFML) to integrate databases and web pages. Thus, a different database backend can be substituted if needs change, while not affecting the front-end access (e.g., ColdFusion), so long as the replacement database supports ODBC. Note that ODBC is but one of many possible database connectivity options.

Associated with goods are shipping options 118. Shipping includes electronic as well as physical distribution. Some goods, such as books, may have only physical distribution, whereas other goods, such as software, may provide electronic and/or physical distribution. If goods are available for electronic distribution, once purchased, the goods are directly copied to the client 100 for use by the purchasers.

Figure 2:
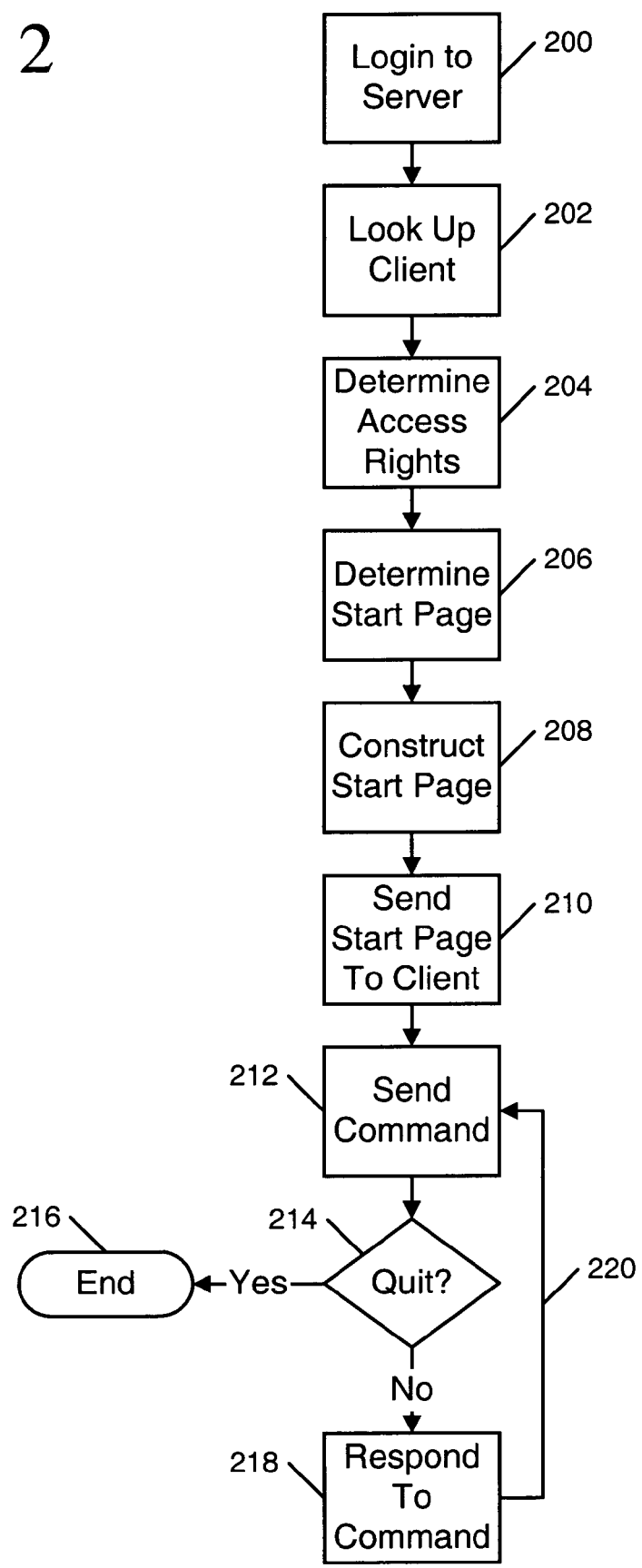
FIG. 2 is a flowchart illustrating the client logging into the distribution server.

FIG. 2 is a flowchart illustrating a manager or other entity responsible for creating a package to be made available for download by connecting clients. The phrase "other entity" is used since management may be automated and therefore driven by a computing device according a rule set, or an expert system or other "artificial intelligence" type of system.

It is assumed there is only a single distribution server, it will be appreciated that if there are multiple servers (not shown), then a package created with respect to one server needs to be identified to other servers. Updating servers can be accomplished by sending (e.g., via push technology protocols) updates from a central repository of packages, by an updated server contacting other known servers, or by some other data push or pull arrangement.

If there are multiple distribution servers, in one embodiment, to conserve space, servers stores only links into a central repository storing downloadable packages. When a client seeks to purchase a particular good to be received over the network 104, the good is actually received from the central repository. Certain high-priority (e.g., popular, secret, etc.) goods may be retained in a local storage of the distribution server.

As illustrated, a first operation is to login 200 to a distribution server 102 (FIG. 1); login includes a series of challenge/response operations designed to authenticate a contacting client to the server. Authenticated credentials determine access rights within the server's distribution environment. In one embodiment, clients can be a "manager" or a "user". However, it will be appreciated that other categories of users, such as "guest", "product manager", "purchasing manager", "finance manager", "community manager", "administrator", etc., may also be defined as required.

Managers oversee people within a particular company, group or organization (hereafter "corporation"). Managers can use the distribution server as other users, but they are also responsible for setting financial and access restrictions for the members of the manager's team. Manager access rights imply purchasing rights or signature authority for the manager's company. As illustrated, it is assumed the distribution server 102 corresponds to a single corporation where mangers have general rights to the distribution server. However, it will be appreciated that a distribution server may serve multiple corporations, and therefore managers and other categories of users are restricted to those goods and operations relevant to a particular corporation.

Users are the "average" client, and can be grouped or categorized. Users may only view, order and install goods in their assigned groups. Group definitions may overlap such that all users may be granted access rights to general goods, while certain departments, such as finance, may have additional finance-only access to other goods. A user's manager determines the type of products a user can purchase, as well as how much money a user can spend out of their department's budget. In addition, in one embodiment, the distribution server can be integrated with or operating as a front end for a traditional mail-order system (or other online system) to allow client access to such external resources.

After authenticating to the server 102, the server looks 202 up the client in a local client database (which may be a part of database 106) to determine 204 the client's access rights. As discussed above, clients only "see" resources for which they have access authorization. After authenticating to the distribution server, customized web pages are dynamically created according to the client's access permissions. In one embodiment, clients may override a default entry page displayed by the distribution server. For example, the default page may be a general information page containing links to all other distribution server resources available to the client. Or, a client may choose to have the entry page always be electronic products available for download by the client.

In one embodiment, customization preferences, such as desired start page, are stored in an HTML "cookie" maintained on the client's machine, and possibly backed up on the distribution server to allow restoration on loss or deletion of the cookie. Alternatively, preferences are stored in a local data-file read by the client's application program (e.g., browser) utilized to access the distribution server. Thus, the server determines 206 the client's start page.

Once the client's authorization and preferences are determined, the distribution server then constructs 208 an appropriate start page for the client, and sends 210 it to the client over the network connection 104 (FIG. 1). Once the start page is received, the client issues 212 commands to the server, and the server responds 218 to the commands. Commands are executed by activating a portion of a web page sent 210 to the client, e.g., clicking on a button, selecting a drop-down list, clicking on an image map, executing a control (e.g., ActiveX or equivalent).

For example, the start page may contain a "Search for . . ." button. Selecting the button causes a search command to be sent from the client to the server, possibly with parameter data regarding the type of search, scope, etc. to perform. If the search button was for locating a product, such as software, on receiving the command the server searches for a product and lists only the product determined to be available to the client according to the client's access authorization determined from login 200 authentication.

If 214 the client's command was a request to quit, then interaction with the distribution server exits 216. If there are pending purchases, the client is brought to a point of sale page and requested to confirm quitting or proceeding with purchase. If the client did not quit, after responding 218 to the command, processing loops 220 back to processing the client's next command.

Figure 3:
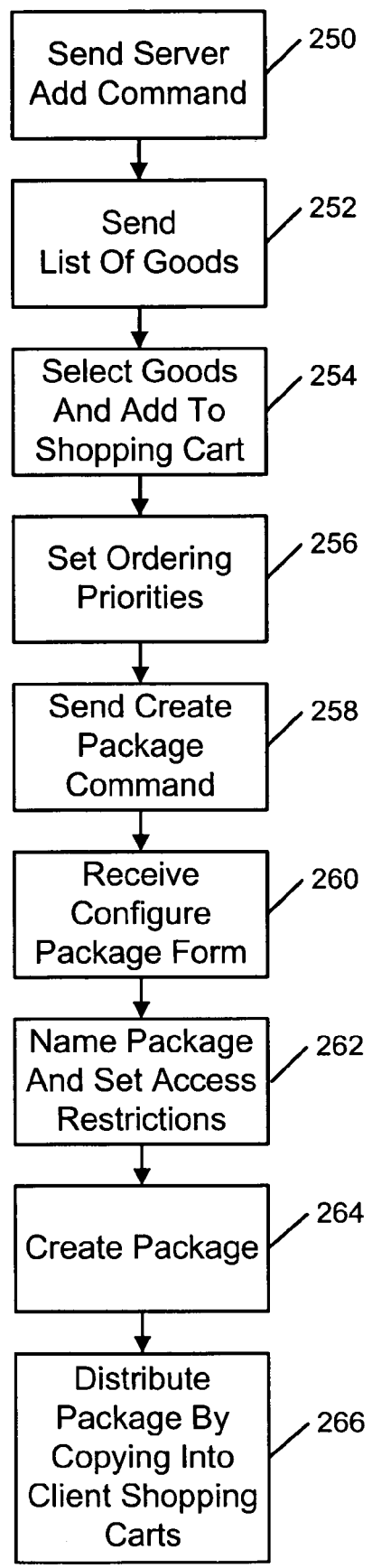
FIG. 3 is a flowchart illustrating creating a package to be made available for download by connecting clients.

FIG. 3 is a flowchart illustrating a manager or other entity responsible for creating a package (collection of physical and electronic goods) to be made available for purchase by connecting clients. Purchase may include downloading the package. A manager is simply a client; however, the term "manager" is used to distinguish between connecting to the server to obtain goods, and connecting to the server to prepare goods for distribution to other clients.

After logging in 200 to the server (FIG. 2), the manager sends 250 an add command to the server. The add command instructs the server that the manager wishes to create a package to be distributed to other clients. In response, the server sends 252 the manager a list of available goods that may be selected for inclusion within the package.

If a desired good for the package is not listed, then the manager must install the missing good onto the distribution server. Installation (not shown) includes copying the electronic goods to the distribution server, entering description and shipping information for the good, entering pricing information, (e.g., fixed, regional, or upgrade) and applicable discounts, rebates, etc., export restrictions, and prerequisites (e.g., vendor requirements to qualify for purchase).

Since the list of possible goods to add to the package can be quite extensive, in one embodiment, as the manager selects 254 goods, they are automatically added to a shopping cart. The manager then assigns 256 ordering priorities for items within the cart. Ordering priorities determine the order in which the various package items are processed when the package is purchased by a client.

After all desired goods have been selected, the manager chooses 258 a "create package" button, or equivalent web page control (e.g., defined in HTML, Java, ActiveX, Cold-Fusion, etc.) to create a package from the shopping cart contents.

In response the server sends 260 a form (or equivalent) requesting a name for the package, and related access restrictions for the package. The manager then decides which clients are allowed to have access to the new package, such as a list of individual clients in a particular programming group, department, or company if there are multiple companies handled by a particular distribution server. Once access rights are set, only clients with appropriate authenticated access rights will have access to the new package.

The manager completes 262 the form, and on submission to the server, causes the package to be named and assigned desired access permissions.

The server then creates 264 the package from the shopping cart contents, assigns the ordering priorities 256, and updates the list of available goods so that the new package is made available to those clients with appropriate access rights. When such clients login to the distribution server, the server recognizes that a new package has been created for these clients, and if not already installed on the client, the new package may optionally be automatically copied 266 into each client's shopping cart. When a client decides to exit the distribution server, the presence of the package in the shopping cart will cause the client to be brought to a point of sale for the package.

Note that the above description assumes a manager issues an explicit add command to a distribution server. In an alternate embodiment, rather than explicitly notifying the distribution server of an add command, instead the manager engages in typical purchase activity and accumulates goods within a shopping cart. Then, rather than proceeding to checkout, instead the manager selects a conversion option to convert all current shopping cart contents into the package.

Figure 4:
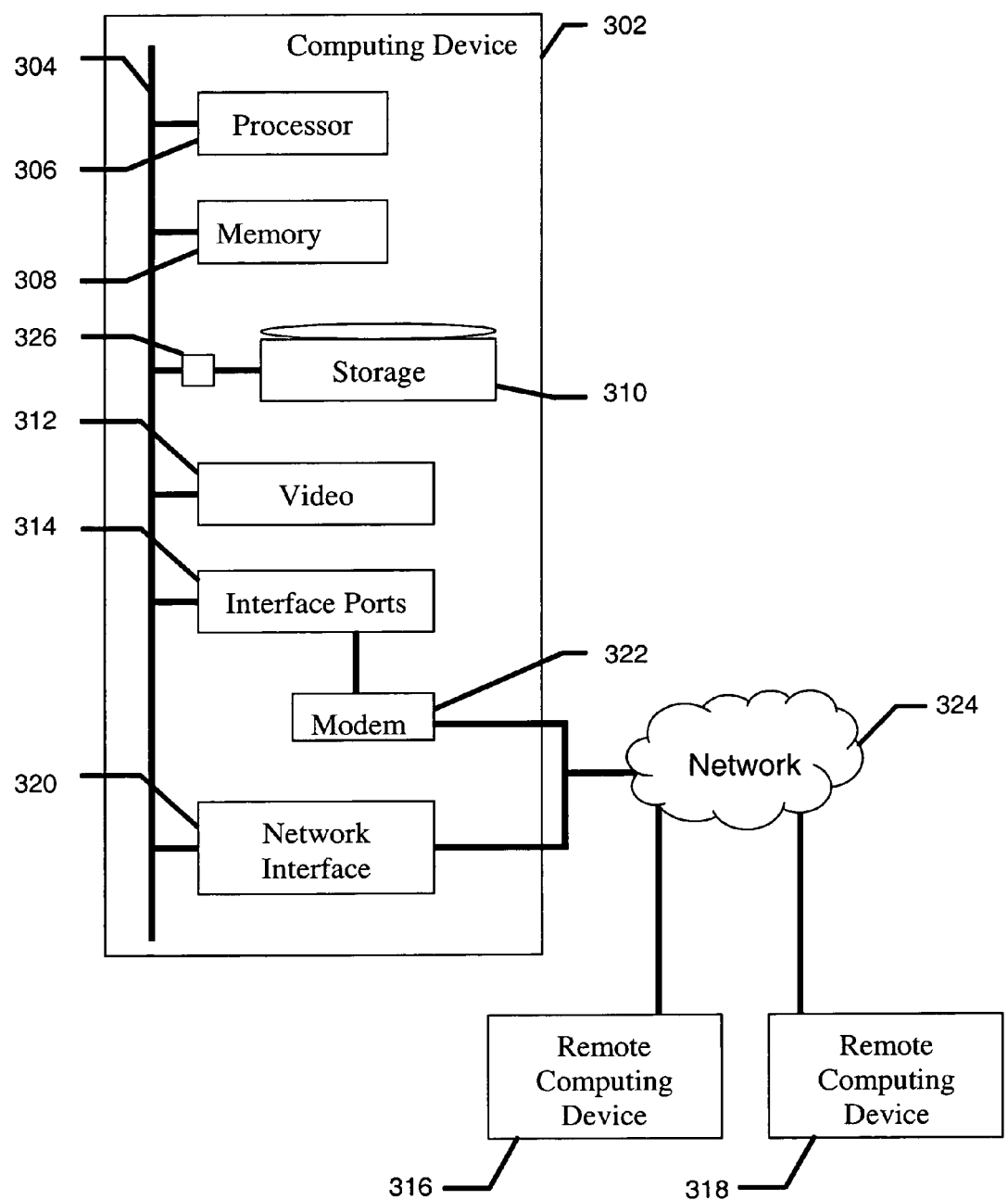
FIG. 4 illustrates a suitable computing environment in which certain aspects of the illustrated invention may be practiced.

FIG. 4 and the following discussion are intended to provide a brief, general description of a suitable computing environment in which certain aspects of the illustrated invention may be implemented. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices.

An exemplary system for implementing the invention includes a computing device 302 having system bus 304 for coupling together various components within the computing device. The system 304 bus may be any of several types of bus structures, such as PCI, AGP, VESA, Microchannel, ISA and EISA, etc. Typically, attached to the bus 304 are processors 306 such as Intel, DEC Alpha, PowerPC, programmable gate arrays, etc., a memory 308 (e.g., RAM, ROM), storage devices 310, a video interface 312, and input/output interface ports 314.

The storage systems and associated computer-readable media provide storage of data and executable instructions for the computing device 302. Storage options include hard-drives, floppy-disks, optical storage, magnetic cassettes, tapes, flash memory cards, memory sticks, digital video disks, and the like, and may be connected to the bus 304 by way of an interface 326. Computing device 302 is expected to operate in a networked environment using logical connections to one or more remote computing devices 316, 318 through a network interface 320, modem 322, or other communication pathway. Computing devices may be interconnected by way of a network 324 such as a local intranet or the Internet.

Thus, for example, with respect to the illustrated embodiments, assuming computing device 302 is a client seeking to purchase a package containing electronic products and hardware, then remote devices 316, 318 may be a distribution server and another client connecting to the distribution server to purchase a different package.

It will be appreciated that remote computing devices 316, 318 may be configured like computing device 302, and therefore include many or all of the elements discussed for computing device 302. It should also be appreciated that computing devices 302, 316, 318 may be embodied within a single device, or separate communicatively-coupled components, and include routers, bridges, peer devices, web servers, and application programs utilizing network application protocols such as HTTP, File Transfer Protocol (FTP), Gopher, Wide Area Information Server (WAIS), and the like.

Having described and illustrated the principles of the invention with reference to illustrated embodiments, it will be recognized that the illustrated embodiments can be modified in arrangement and detail without departing from such principles.

And, even though the foregoing discussion has focused on particular embodiments, it is understood that other configurations are contemplated. In particular, even though expressions such as "in one embodiment," "in another embodiment," and the like are used herein, these phrases are meant to generally reference embodiment possibilities, and are not intended to limit the invention to particular embodiment configurations. As used herein, these terms may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method of using an electronic shopping cart to facilitate defining a distribution package, comprising:
   connecting to an online distribution server;
   receiving a list of goods available for electronic and/or physical distribution to a client;
   selecting goods from the list;
   adding said selected goods to an electronic shopping cart;
   requesting creation of a distribution package according to contents of electronic shopping cart; and
   assigning access restrictions for the distribution package, said restrictions controlling access by the client to the distribution package.

2. The method of claim 1, further comprising:
   sending a client identifier to the online distribution server;
   wherein said list has contents constrained according to access privileges associated with the client identifier.

3. The method of claim 2, wherein the access privileges associated with the client identifier are stored on the online distribution server.

4. The method of claim 2, further comprising:
   storing said access privileges within the client identifier;
   wherein said access privileges are signed with a public key of the online distribution server.

5. The method of claim 1, wherein the goods comprise physical goods, electronic goods, or services.

6. The method of claim 5, wherein a first grouping of the goods is available electronically, and a second grouping of the goods is unavailable electronically but is available through physical shipping to a client.

7. The method of claim 1, wherein the list of goods comprises goods available from at least two different sources communicatively coupled with the online distribution server.

8. The method of claim 1, wherein the distribution package has at least one portion having a security requirement restricting access to the portion to clients meeting the security requirement.

9. A machine-accessible medium having instructions encoded thereon for using an electronic shopping cart to facilitate defining a distribution package, said instructions, when accessed, capable of directing a machine to:
   connect to an online distribution server;
   receive a list of goods available for electronic and physical distribution to a client;
   select goods from the list;
   add said selected goods to an electronic shopping cart;
   request creation of a distribution package according to contents of electronic shopping cart; and
   assign access restrictions for the distribution package, said restrictions controlling access by the client to the distribution package.

10. The medium of claim 9, said instructions including further instructions to direct the machine to:
    send a client identifier to the online distribution server;
    wherein said list has contents constrained according to access privileges associated with the client identifier.

11. The medium of claim 10, wherein the access privileges associated with the client identifier are stored on the online distribution server.

12. The medium of claim 10, said instructions including further instructions to direct the machine to:
    store said access privileges within the client identifier;
    wherein said access privileges are signed with a public key of the online distribution server.

13. The medium of claim 9, wherein the goods comprise physical goods, electronic goods, or services.

14. The medium of claim 13, wherein a first grouping of the goods is available electronically, and a second grouping of the goods is unavailable electronically but is available through physical shipping to a client.

15. A method of using an electronic shopping cart to facilitate defining a distribution package, comprising:
    receiving a connection from a manager-client by an online distribution server;
    determining a client identifier;
    sending a list of goods to the manager-client based at least in part on the client identifier;
    receiving a selection of goods from the list;
    adding said selected goods to a client-side electronic shopping cart;
    receiving a creation request for a distribution package;
    creating the distribution package from the contents of the client-side electronic shopping cart; and
    assigning access restrictions for the distribution package, said restrictions controlling access by user-clients to the distribution package.

16. The method of claim 15, further comprising:
    determining client access rights associated with the client identifier; and
    restricting the list of goods according to said client access rights.

17. The method of claim 16, wherein the access privileges associated with the client identifier are stored in a second memory of the online distribution server.

18. The method of claim 16, further comprising:
    storing said access privileges within a client memory storage;
    wherein said access privileges are signed with a public key of the online distribution server so as to prevent tampering of said access privileges by the client.

19. The method of claim 15, further comprising:
validating the selection of goods based at least in part on the client identifier.

20. A machine-accessible medium having instructions encoded thereon for using an electronic shopping cart to facilitate defining a distribution package, said instructions, when accessed, capable of directing a machine to:
receive a connection from a manager-client by an online distribution server;
determine a client identifier;
send a list of goods to the manager-client based at least in part on the client identifier;
receive a selection of goods from the list;
add said selected goods to a client-side electronic shopping cart;
receive a creation request for a distribution package;
create the distribution package from the contents of the client-side electronic shopping cart; and
assign access restrictions for the distribution package, said restrictions controlling access by user-clients to the distribution package.

21. The medium of claim 20, said instructions including further instructions to direct the machine to:
determine client access rights associated with the client identifier; and
restrict the list of goods according to said client access rights.

22. The medium of claim 21, wherein the access privileges associated with the client identifier are stored in a second memory of the online distribution server.

23. The medium of claim 21, said instructions including further instructions to direct the machine to:
store said access privileges within a client memory storage;
wherein said access privileges are signed with a public key of the online distribution server so as to prevent tampering of said access privileges by the client.

24. The medium of claim 20, said instructions to create the distribution contents further comprising instructions capable of directing the machine to:
validate the selection of goods based at least in part on the client identifier.

25. A method of using an electronic shopping cart to facilitate defining a distribution package, comprising:
receiving a connection from a manager-client;
determining an identifier for the manager-client;
assembling, based at least in part on the identifier, a list of goods available for electronic and/or physical distribution to a user-client;
receiving a selection of a good from the list;
adding said selected good to an electronic shopping cart of the manager-client;
receiving a request for creation of a distribution package determined based at least in part on the contents of the electronic shopping cart.

26. The method of claim 25, wherein the list of goods comprises goods from at least two different sources.

27. A method comprising:
a client connecting to a distribution server having associated packages, each package identifying selected ones of electronic and physical goods and updates thereto, and each package having an associated access control set by a creator of the package;
receiving a list of goods identifying at least one good available by electronic distribution;
selecting the good available for electronic distribution;
determining the good is currently installed on the client;
determining an update to the good is available from the distribution server; and
updating said installed good with the update.

28. The method of claim 27, further comprising:
responsive to determining the update, automatically performing the updating said installed good.

29. The method of claim 27, in which the creator has a relation to the client, the method further comprising:
determining an operator of the client;
wherein the relation includes the creator being a superior of the client.

* * * * *